United States Patent
Noguchi et al.

(10) Patent No.: US 6,850,690 B1
(45) Date of Patent: Feb. 1, 2005

(54) INFORMATION RECORDING APPARATUS, INFORMATION RECORDING AND REPRODUCING APPARATUS AND RECORD MEDIUM

(75) Inventors: Tadashi Noguchi, Tokorozawa (JP); Eisaku Kawano, Tokorozawa (JP); Jiro Endo, Tokorozawa (JP); Eiji Muramatsu, Tokorozawa (JP); Shinji Suzuki, Tokorozawa (JP)

(73) Assignee: Pioneer Electronic Corporation, Tokyo-To (JP)

( * ) Notice: Subject to any disclaimer, the term of this patent is extended or adjusted under 35 U.S.C. 154(b) by 0 days.

(21) Appl. No.: 09/266,780

(22) Filed: Mar. 12, 1999

(30) Foreign Application Priority Data

Mar. 12, 1998 (JP) .......................................... P10-061359

(51) Int. Cl.$^7$ ................................................ H04N 5/91

(52) U.S. Cl. ........................... 386/46; 386/126; 386/83; 725/43; 725/58

(58) Field of Search ........................... 386/46, 83, 125, 386/126, 85, 95–97; 725/43, 53, 54, 58; 348/460, 569, 906; 360/27, 13

(56) References Cited

U.S. PATENT DOCUMENTS

| | | | | | |
|---|---|---|---|---|---|
| 4,899,370 | A | * | 2/1990 | Kameo et al. | 386/83 |
| 5,488,409 | A | * | 1/1996 | Yuen et al. | 386/83 |
| 5,686,954 | A | * | 11/1997 | Yoshinobu et al. | 725/58 |
| 6,128,434 | A | * | 10/2000 | Hirayama et al. | 386/97 |
| 6,169,844 | B1 | * | 1/2001 | Arai | 386/83 |
| 6,188,662 | B1 | * | 2/2001 | Maeda et al. | 360/13 |

FOREIGN PATENT DOCUMENTS

WO    WO 93/10536    5/1993

* cited by examiner

*Primary Examiner*—Thai Tran
*Assistant Examiner*—Christopher Onuaku
(74) *Attorney, Agent, or Firm*—Morgan, Lewis & Bockius LLP (57) ABSTRACT

On a record medium, record information and reservation information to perform a reserved recording operation for the record information are recorded. The reservation information has: a scheduled time to start recording onto the record medium the record information of particular one kind, which is set in advance for respective one of record mediums including the record medium, among the record information of a plurality of different kinds which are recordable on the one record mediums; and a scheduled time to stop recording onto the record medium the record information of the particular one kind.

6 Claims, 6 Drawing Sheets

| RESERVATION NUMBER (10) | CHANNEL (11) | DATE (12) | TIME TO START (13) | TIME TO STOP (14) | TELERECORDING MODE (15) |
|---|---|---|---|---|---|
| 1 | 10 | Oct. 11 | PM 9:00 | AM :00 | 3 TIMES |
| 2 | 1 | EVERY DAY | AM 6:00 | AM 6:30 | 3 TIMES |
| 3 | 8 | EVERY TUESDAY | PM 5:00 | PM 5:30 | STANDARD |
| 4 | − | − | − | − | − |
| 5 | − | − | − | − | − |

| RECORD NUMBER (16) | CHANNEL (17) | DATE (18) | TIME TO START (19) | TIME TO STOP (20) | TELERECORDING MODE (21) | START ADRESS (22) | END ADRESS (23) |
|---|---|---|---|---|---|---|---|
| 1 | 1 | Oct. 9 | AM 6:00 | AM 6:30 | 3 TIMES | 000 | 029 |
| 2 | 1 | Oct. 10 | AM 6:00 | AM 6:30 | 3 TIMES | 030 | 059 |
| 3 | 1 | Oct. 11 | AM 6:00 | AM 6:30 | 3 TIMES | 060 | 089 |
| 4 | 8 | Oct. 11 | PM 5:00 | PM 5:30 | STANDARD | 090 | 179 |
| 5 | 10 | Oct. 11 | PM 9:00 | AM 11:00 | 3 TIMES | 180 | 299 |
| 6 | 1 | Oct. 10 | AM 6:00 | AM 6:30 | 3 TIMES | 300 | 329 |
| 7 | − | − | − | − | − | − | − |

| RECORD NUMBER (16) | CHANNEL (17) | DATE (18) | TIME TO START (19) | TIME TO STOP (20) | TELERECORDING MODE (21) | START ADRESS (22) | END ADRESS (23) |
|---|---|---|---|---|---|---|---|
| 1 | 1 | Oct. 9 | AM 6:00 | AM 6:30 | 3 TIMES | 000 | 029 |
| 2 | 1 | Oct. 10 | AM 6:00 | AM 6:30 | 3 TIMES | 030 | 059 |
| 3 | 1 | Oct. 11 | AM 6:00 | AM 6:30 | 3 TIMES | 060 | 089 |
| 4-1 | 8 | Oct. 11 | AM 5:00 | AM 5:30 | STANDARD | 090 | 119 |
| 4-2 | 8 | Oct. 11 | AM 5:00 | AM 5:30 | STANDARD | 150 | 209 |
| 5 | 10 | Oct. 11 | PM 9:00 | AM 11:00 | 3 TIMES | 180 | 299 |
| 6 | 1 | Oct. 10 | AM 6:00 | AM 6:30 | 3 TIMES | 300 | 329 |
| 7 | − | − | − | − | − | − | − |

INFORMATION RECORDING APPARATUS, INFORMATION RECORDING AND REPRODUCING APPARATUS AND RECORD MEDIUM

BACKGROUND OF THE INVENTION

1. Field of the Invention

The present invention generally relates to an information recording apparatus, and an information recording and reproducing apparatus, which can record a television broadcast etc., and is represented by a home video tape recorder (hereinbelow, it is simply referred to as a VTR), and more particularly to an information recording apparatus and an information recording and reproducing apparatus, which is capable of a so-called reserved recording operation i.e., which can set a scheduled time to start recording and a schedule time to stop recording beforehand in accordance with a future broadcast schedule and can automatically start and stop recording the television broadcast etc. The present invention also relates to a record medium on which such a reserved recording operation can be performed.

2. Description of the Related Art

When an information recording apparatus, which is capable of performing a reserved recording operation among the above mentioned information recording apparatuses such as the home VTR and the like, performs the reserved recording operation for a television broadcast etc., the reservation information including the scheduled time to start recording (including the date), the scheduled time to stop recording, the television channel to be used and so on are firstly stored in a memory in the information recording apparatus. Then, a video tape etc., onto which the television broadcast is to be recorded is loaded or inserted into the information recording apparatus, and the timer is set.

By this kind of operation, it is automatically started to record the television broadcast etc., onto the record medium, when it comes the above mentioned time to start recording.

On the other hand, the above mentioned reservation information may further include, other than the above, (i) information indicating the broadcasting day of the week in case of recording a series program such as a television series drama which is weekly broadcasted, and (ii) information indicating the fact that the program is daily broadcasted in case of recording the program which is daily broadcasted every day at the same time.

However, according to the above mentioned information recording apparatus, in case of performing the reserved recording operation, it is necessary to insert the record medium, onto which the television broadcast etc., is to be recorded, into the information recording apparatus when the television broadcast etc., to be recorded is started. Hence, it is a troublesome job to insert the record medium at the appropriate time, and if the record medium is not inserted at that time, the television broadcast etc., cannot be recorded, resulting in that the continuity of the television broadcast etc., to be recorded onto the record medium is lost, which is one problem.

Further, after one operation of recording the television broadcast etc., is finished, if the record medium is left as it is, another operation of recording the television broadcast etc., may be performed on the basis of another reservation information, resulting in that the continuity of the television broadcast etc., may be lost, and that the convenience is drastically degraded, which is another problem.

SUMMARY OF THE INVENTION

It is therefore an object of the present invention to provide an information recording apparatus, an information recording and reproducing apparatus, and a record medium, which can certainly record a specific record information such as a television broadcast etc., having a continuity onto one record medium while keeping the continuity simply and conveniently, if the reserved recording operation is performed.

The above object of the present invention can be achieved by a record medium such as an optical disc or the like, on which record information and reservation information to perform a reserved recording operation for the record information are recorded. The reservation information has: a scheduled time to start recording onto the record medium the record information of particular one kind, which is set in advance for respective one of record mediums including the record medium, among the record information of a plurality of different kinds which are recordable on the record mediums; and a scheduled time to stop recording onto the record medium the record information of the particular one kind.

According to the record medium of the present invention, the reservation information having the scheduled time to start recording and the scheduled time to stop recording as for the record information of the particular one kind is recorded on the record medium. Thus, since the reservation information corresponding to the record information of the particular one kind, which is particular or exclusive to respective one of the record mediums, by reading out the reservation information before recording the record information of this particular one kind and then selecting the record information of this particular one kind from among the record information of the different kinds on the basis of the read out reservation information so as to record the selected record information, it is possible to record only the record information of this particular one kind onto the pertinent record medium.

Consequently, for example, it is possible to collectively record onto one record medium one series of record information of the particular one kind easily and certainly in case that one series of record information of the particular one kind is discontinuously inputted at different times (e.g., a weekly television broadcast program which is discontinuously inputted at an interval of one week).

In one aspect of the record medium of the present invention, according to claim 1, the record medium comprises a disc-shaped type record medium, and the reservation information is recorded at a most inner-circumferential portion of a recordable area of the disc-shaped type record medium.

Accordingly, when recording and/or reproducing the record information, it is possible to speedily perform searching the record position and the reservation information.

The above object of the present invention can be also achieved by an information recording apparatus for recording record information of particular one kind onto a record medium, on which the record information and reservation information to perform a reserved recording operation for the record information are recordable, the reservation information comprising: a scheduled time to start recording onto the record medium the record information of the particular one kind, which is set in advance for respective one of record mediums including the record medium, among the record information of a plurality of different kinds which are recordable on the record mediums; and a scheduled time to stop recording onto the record medium the record information of the particular one kind. The information recording apparatus is provided with: a read out device such as an optical pickup or the like for reading out the reservation information from the record medium; an extraction device such as a television tuner or the like for extracting the record information of the particular one kind from among the record information of the different kinds which are inputted from the external; and a record device such as an optical pickup or the like for starting recording onto the record medium the extracted record information of the particular one kind when it is the scheduled time to start recording and for stopping recording onto the record medium the extracted record information of the particular one kind when it is the schedule time to stop recording, on the basis of the read out reservation information.

According to the information recording apparatus of the present invention, the reservation information is read out from the record medium by the reading apparatus. On the other hand, the record information of the particular one kind is extracted from among the record information of the different kinds, which are inputted from the external, by the extraction device. Then, on the basis of the read out reservation information, when it is the scheduled time to start recording, it is started by the record device to record the extracted record information of the particular one kind onto the record medium. Then, on the basis of the read out reservation information, when it is the schedule time to stop recording, it is stopped by the record device to record the extracted record information of the particular one kind onto the record medium.

Therefore, since the reservation information corresponding to the record information of the particular one kind is read out, and since it is started and stopped to record the record information of this particular one kind in accordance with the read out reservation information, it is possible to record only the record information of this particular one kind onto the pertinent record medium.

Consequently, for example, it is possible to collectively record onto one record medium one series of record information of the particular one kind easily and certainly in case that one series of record information of the particular one kind is discontinuously inputted at different times.

In one aspect of the information recording apparatus of the present invention, the information recording apparatus is further provided with a generation device such as a system control unit or the like for generating the reservation information on the basis of the scheduled time to start recording and the scheduled time to stop recording which are set in advance of the reserved recording operation. The record device records onto the record medium the generated reservation information before recording the record information of the particular one kind.

According to this aspect, on the basis of the scheduled time to start recording and the scheduled time to stop recording, which are set in advance of the reserved recording operation, the reservation information is generated by the generation device. Then, before actually recording the record information of the particular one kind, the generated reservation information is recorded onto the record medium, by the record device. Thus, it is possible to produce the record medium on which the reservation information to record the record information of the particular one kind is recorded in advance.

In another aspect of the information recording apparatus of the present invention, the information recording apparatus is further provided with a memory device such as a reservation memory unit or the like for storing the reservation information separately from the record medium. The record device records the record information of the particular one kind in accordance with the reservation information recorded on the record medium in preference to the reservation information stored in the memory device if the reservation information is recorded on the record medium. Alternatively, the record device records the record information of the particular one kind in accordance with the reservation information stored in the memory device if the reservation information is not recorded on the record medium.

According to this aspect, the reservation information is stored separately from the record medium in the memory device. Then, if the reservation information is recorded on the record medium, the record information of the particular one kind is recorded by the record device in accordance with the reservation information recorded on the record medium in preference to the reservation information stored in the memory device. Alternatively, if the reservation information is not recorded on the record medium, the record information of the particular one kind is recorded by the record device in accordance with the reservation information stored in the memory device. Thus, even if the reservation information is not recorded on the record medium, it is still possible to perform the reserved recording operation for the record information of the particular one kind, in accordance with the reservation information stored in the memory device.

In another aspect of the information recording apparatus of the present invention, the record device further records onto the record medium history information when recording the record information of the particular one kind is finished, the history information comprising a recording date, a time to start recording, a time to stop recording and a recording position on the record medium. The information recording apparatus is further provided with a control device such as a system control unit or the like for controlling the record device to record new record information of the particular one kind to a non-recorded area on the record medium if there exists the non-recorded area in accordance with the history information, and to record the new record information of the particular one kind to a recorded area where the oldest record information of the particular one kind has been recorded if there does not exists the non-recorded area in accordance with the history information.

According to this aspect, when recording the record information of the particular one kind is finished, the history information having the recording date, the time to start recording, the time to stop recording and the recording position on the record medium is recorded by the record device onto the record medium. Then, under the control of the control device, if there exists the non-recorded area in accordance with the history information, the record device records the new record information of the particular one kind to a non-recorded area on the record medium. Alternatively, under the control of the control device, if there does not exists the non-recorded area in accordance with the history information, the record device records the new record information of the particular one kind to the recorded area where the oldest record information of the particular one kind has been recorded.

Thus, since the new record information can be recorded to the appropriate area in accordance with the history information, it is possible to avoid the case in which the new television broadcast of the particular kind cannot be recorded.

In another aspect of the information recording apparatus of the present invention, the record medium comprises a disc-shaped type record medium, and the reservation information is recorded at a most inner-circumferential portion of a recordable area of the disc-shaped type record medium.

Accordingly, when recording the record information, it is possible to speedily perform searching the record position and the reservation information.

The above object of the present invention can be also achieved by an information recording and reproducing apparatus for recording and reproducing record information of particular one kind onto and from a record medium, on which the record information and reservation information to perform a reserved recording operation for the record information are recordable, the reservation information comprising: a scheduled time to start recording onto the record medium the record information of the particular one kind, which is set in advance for respective one of record mediums including the record medium, among the record information of a plurality of different kinds which are recordable on the record mediums; and a scheduled time to stop recording onto the record medium the record information of the particular one kind. The information recording and reproducing apparatus is provided with: the above described information recording apparatus of the present invention; and a reproduction device such as an optical pickup or the like for reproducing the record information of the particular one kind from the record medium.

According to the information recording and reproducing apparatus of the present invention, the recording operation is performed in the same manner as the above described information recording apparatus of the present invention. Further, the record information of the particular one kind is reproduced from the record medium by the reproduction device.

Therefore, it is possible to perform the reserved recording operation and the reproduction operation based on the reservation information by use of just one piece of apparatus.

In one aspect of the information recording and reproducing apparatus of the present invention, the record medium comprises a disc-shaped type record medium, and the reservation information is recorded at a most inner-circumferential portion of a recordable area of the disc-shaped type record medium.

Accordingly, when recording and reproducing the record information, it is possible to speedily perform searching the record position and the reservation information.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Referring to the accompanying drawings, an embodiment of the present invention will be now explained. In the embodiment explained hereinbelow, the present invention is applied to an information recording and reproducing apparatus, which is adapted to receive a television broadcast and record it onto a record medium such as an optical disc etc., (hereinbelow, recording the television broadcast is simply referred to as "telerecording") and further reproduce it from the record medium.

At first, a construction and a whole operation of an information recording and reproducing apparatus is explained with reference to FIG. 1 and FIG. 2.

Figure 1:
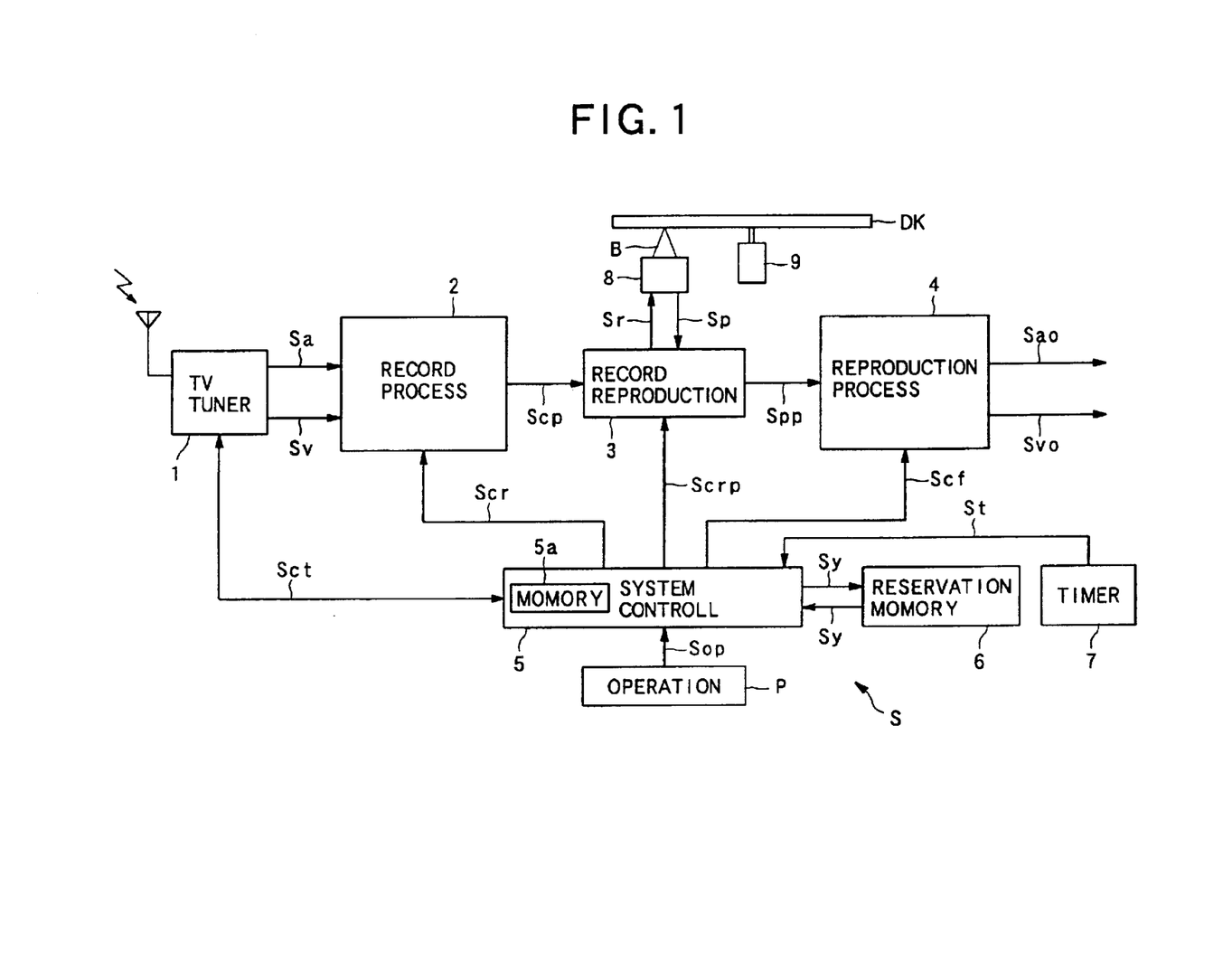
FIG. 1 is a block diagram of an information recording and reproducing apparatus as an embodiment of the present invention.

In FIG. 1, an information recording and reproducing apparatus S is provided with: a television (TV) tuner 1 as an extraction device; a record process unit 2; a record reproduction unit 3; a reproduction process unit 4 as a reproduction device; a system control unit 5 as a record device, a generation device and a control device; a reservation memory unit 6 as a memory device; a timer 7; an optical pickup 8 as a reproduction device, a record device and a read out device; a spindle motor 9; an optical disc DK as a record medium; and an operation unit P.

Incidentally, the system control unit 5 has a memory 5a internally which temporarily stores data etc., necessary for the process thereof.

Next, a construction of the optical disc DK is explained with reference to FIG. 2.

Figure 2:
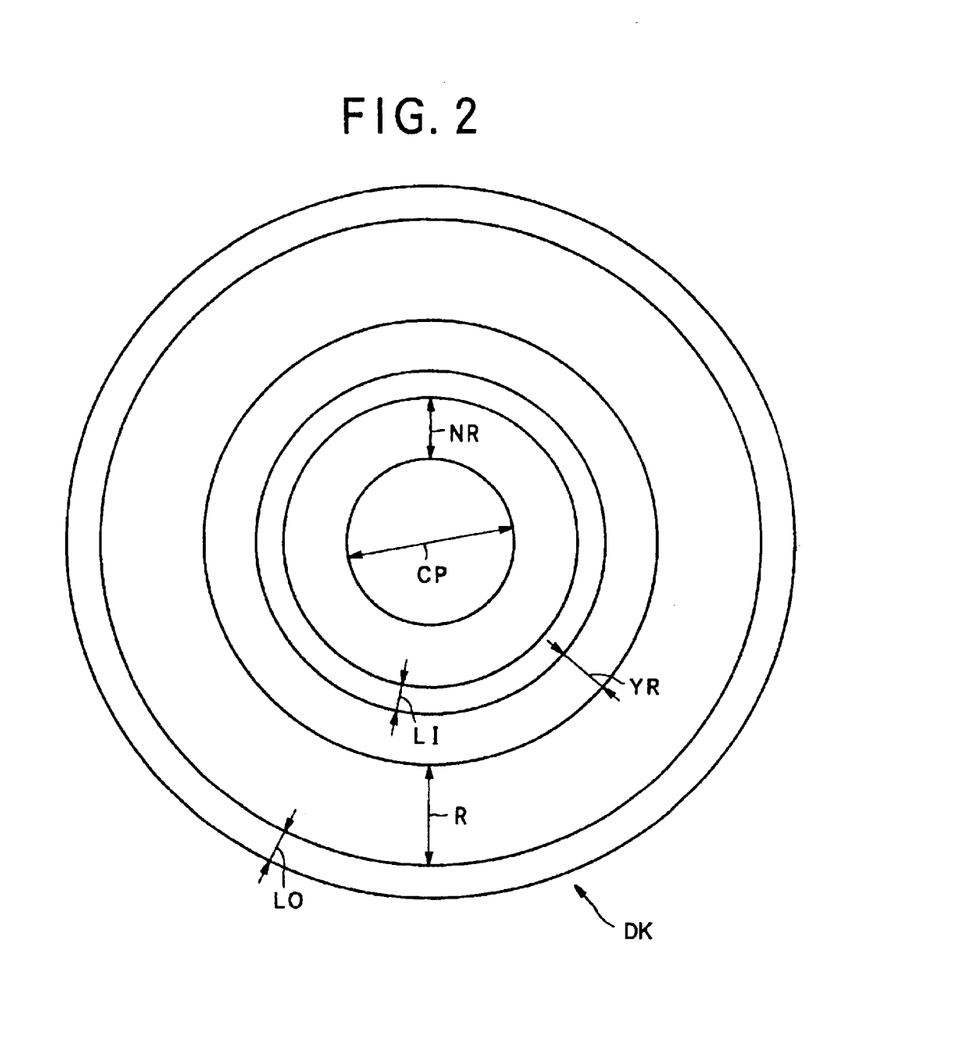
FIG. 2 is a plan view of an optical disc in the embodiment.

In FIG. 2, the optical disc DK has: a clamp aperture CP which is an aperture to fix the optical disc DK to a rotation shaft of the spindle motor 9; a non-recorded portion NR to which information is not recorded; a lead in area LI which indicates a start of the record area and to which a so-called TOC (Table Of Content) information etc., is recorded; a reservation information area YR to which reservation information and record-finished information described later are recorded; a record area R to which the record information such as a television broadcast etc., is actually recorded; and a lead out area LO indicating the end of the record area.

Next, the whole operation of the information recording and reproducing apparatus S is explained.

At first, the operation of telerecording the television broadcast is explained.

When telerecording the television broadcast, the television tuner 1 receives a television broadcast electric wave corresponding to a channel desired to be telerecorded through an antenna, on the basis of a control signal Sct from the system control unit 5. Then, on the basis of the received electric wave, an audio signal Sa corresponding to an audio included in the television broadcast and an image signal Sv corresponding to an image included in the television broadcast are generated, and are outputted to a record process unit 2.

Next, the record process unit 2 composes and encodes the inputted audio signal Sa and the image signal Sv on the basis of a control signal Scr from the system control unit 6, so as to generate a composite signal Scp and output it to the record reproduction unit 3.

Then, the record reproduction unit 3 applies processes onto the inputted composite signal Scp such as a process of converting it to the record format for recording it onto the optical disc DK, on the basis of a control signal Scrp from the system control unit 5 so as to output it as a record signal Sr to the optical pickup 8.

Next, the optical pickup 8 records the audio and video corresponding to the received television broadcast onto the record area R by emitting a light beam B, which is modulated by the record signal Sr, onto the record area R in the optical disk DK, which is rotated at a predetermined rotation number by the spindle motor 9, so as to form pits corresponding to the record signal Sr to the record area R.

On the other hand, when the reservation information which includes the scheduled time to start recording, the scheduled time to stop recording and the recording day or date (which includes every day, every Monday etc.,) as for the television broadcast to be telerecorded onto the optical disk DK, the broadcasting channel to be received and the telerecording mode (e.g., the telerecording mode such as a normal mode, a 3 times mode or the like) is inputted as an operation signal Sop from the operation unit P, the system control unit 6 outputs the reservation information as one portion of the control signal Scrp to the record reproduction unit 3 by the operation described later, and also outputs the reservation information as one portion of the reservation signal Sy to the reservation memory unit 6 so as to store it.

Then, the record reproduction unit 3 records the reservation information inputted as one portion of the control signal Scrp to a predetermined position in the reservation information area YR on the optical disc DK by a method same as the above mentioned method for the audio or video through the optical pickup 8.

Figure 3A:
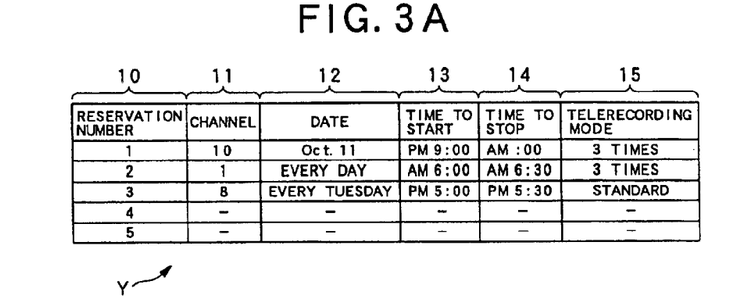
FIG. 3A is a diagram showing an example of a reservation information in the embodiment.

Here, as the format of the reservation information, as shown in FIG. 3A for example, reservation number information 10, channel information 11, recording date information 12, scheduled time to start recording information 13, schedule time to stop recording information 14 and telerecording mode information 15 are included for each television broadcast to be telerecorded, and are recorded in the reservation information record area YR as the reservation information Y as a whole.

Further, when the operation of recording the audio and video corresponding to one television broadcast is finished, the system control unit 5 controls the record reproduction unit 3 to record the record-finished information as history information corresponding to the recorded audio and video to another position within the reservation information record area YR.

Figure 3B:
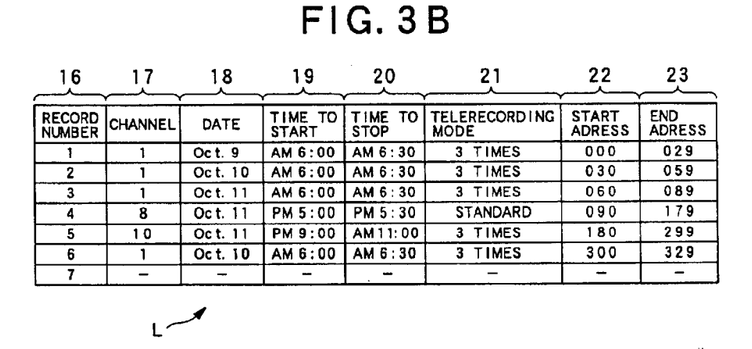
FIG. 3B is a diagram showing an example of a record-finished information (I) in the embodiment.

Here, as the format of the record-finished information, as shown in FIG. 3B for example, record number information 16, channel information 17, recording date information 18, a time to start recording 19, a time to stop recording 20, telerecording mode information 21, a start address 22 indicating a start position of the area where the audio and video corresponding to the television broadcast is recorded on the optical disc DK, and an end address 23 which indicates an end position of the area where the audio and video corresponding to the television broadcast is recorded on the optical disc DK, are included for each television broadcast to be telerecorded, and are recorded in the reservation information record area YR, at a position different from that of the reservation information Y, as the record-finished information L as a whole.

Figure 3C:
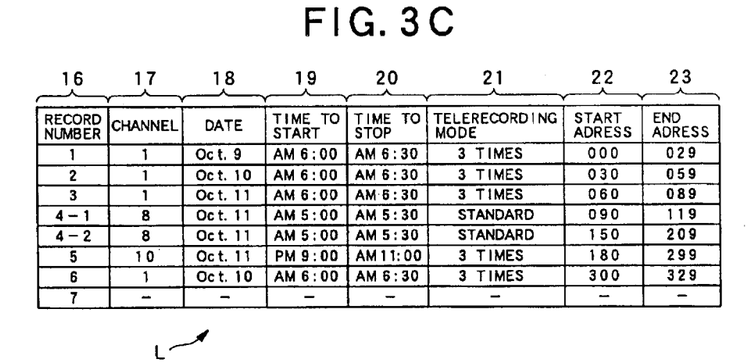
FIG. 3C is a diagram showing an example of a record-finished information (II) in the embodiment.

Incidentally, by the operation described later (refer to FIG. 6), when one television broadcast is recorded dispersedly to more than two areas, the start address 22 and the end address 23 for each of the dispersed record areas are recorded as indicated by the record numbers "4-1" and "4-2" as shown in FIG. 3C for example.

Further, the reservation memory unit 6 including a non-volatile type memory stores the reservation information (whose concrete content may be same as the reservation information Y shown in FIG. 3A and may be different from that) same as the above described reservation information Y, independently from the optical disk DK, and outputs it as the reservation signal Sy to the system control unit 5 by the following operation as the occasion demands.

Along with this, the system control unit 5 performs the above described respective control operations on the basis of the timer signal St from the timer 7. At this time, when performing the reservation telerecording operation, the reservation information on the optical disc DK or in the reservation memory unit 6 is firstly read out as described later, and then the reservation telerecording operation is performed by controlling the television tuner 1, the record process unit 2, the record reproduction unit 3 and so on, on the basis of the read out reservation information.

Next, the operation at the time of reproducing the recorded television broadcast is explained.

At the time of reproducing the television broadcast, at first, the record reproduction unit 3 controls the optical pickup 8, on the basis of the control signal Scrp from the system control unit 5, to emit the light beam B onto the record position of the television broadcast, which is to be reproduced, on the optical disc DK which is being rotated.

At this time, the record position is pointed by use of the start address 22 and the end address 23 in the record-finished information L which is read out by emitting the light beam B in advance.

Next, the record reproduction unit 3 applies a decode process etc., with respect to a detection signal Sp based on the reflected light from the optical disc DK of the light beam B which is outputted from the optical pickup 8, and outputs the processed signal as a decoded signal Spp to the reproduction process unit 4.

Then, the reproduction process unit 4 separates the audio signal and the video signal from the decoded signal Spp on the basis of the control signal Scf from the system control unit 5, and outputs them as an audio output signal Sao and a video output signal Svo to be reproduced to the external.

Next, the reservation telerecording operation in the present embodiment is explained with reference to FIG. 4 to FIG. 6 mainly as for the control operations performed by the system control unit 5.

At first, the operation of recording the reservation information Y onto the optical disc DK is explained with reference to a flow chart shown in FIG. 4.

Figure 4:
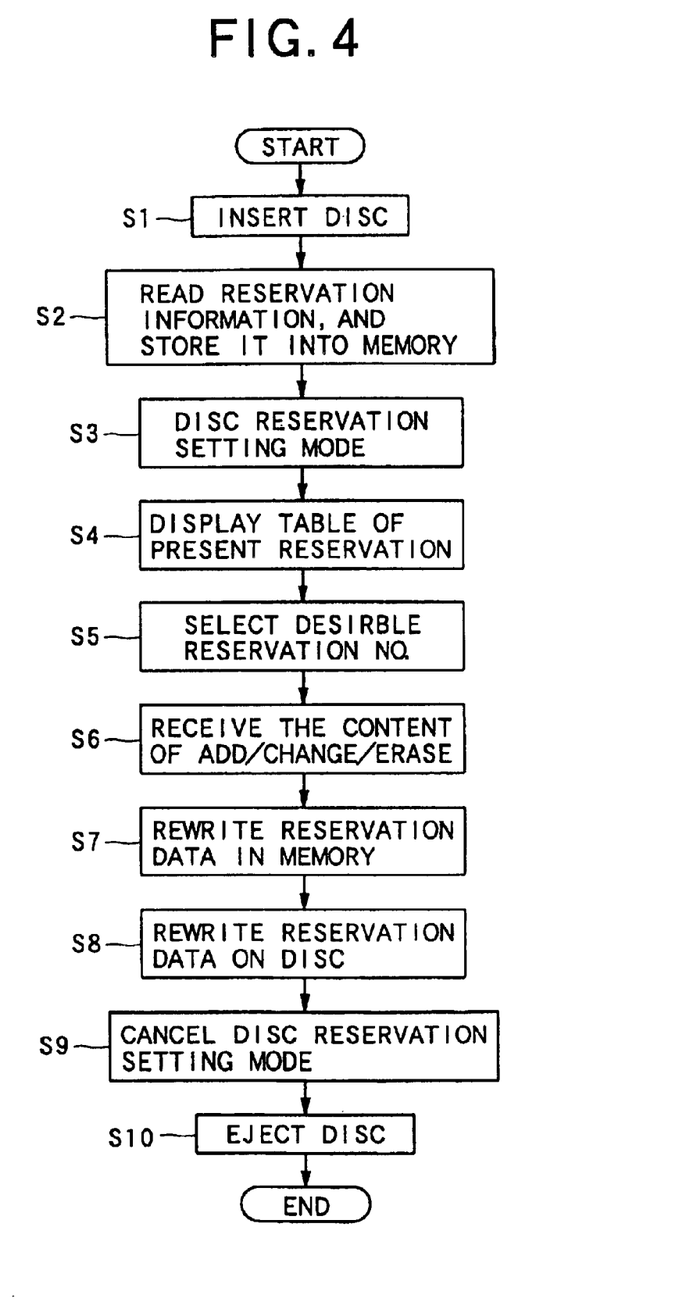
FIG. 4 is a flow chart showing an operation of recording the reservation information in the embodiment.

As shown in FIG. 4, in the operation of recording the reservation information Y, at first, the optical disc DK is inserted into the information recording and reproducing apparatus S (step S1). Then, the reservation information Y which has been already recorded on the optical disc DK is read out, and is stored into the memory 5a in the system control unit 5 (step S2).

Then, when the user instructs at the operation unit P to record the reservation information Y onto the optical disc DK, the operation mode is switched to a disc reservation setting mode in which the record reproduction unit 3 records the reservation information Y (step S3).

Then, on the basis of the read out reservation information Y, a table as shown in FIG. 3A indicating the present reservation status is displayed on a display unit (step S4).

Then, a display for allowing the user to select the reservation number with respect to which the content of the reservation information Y is desired to be added, changed or erased by the user, is performed (step S5). When it is instructed at the operation unit P to add, change or erase the content of the reservation information Y corresponding to the display, it is received (step S6).

Then, the reservation information Y in the memory 5a is rewritten on the basis of the instructed content (step S7), and the old reservation information Y on the optical disc DK is replaced by the rewritten reservation information (step S8).

Then, the disc reservation setting mode of the information recording and reproducing apparatus S is canceled (step S9). The optical disc DK is ejected to the external (step S10), and the processes are ended.

Next, the operation of actually telerecording the television broadcast is explained with reference to a flow chart shown in FIG. 5.

Figure 5:
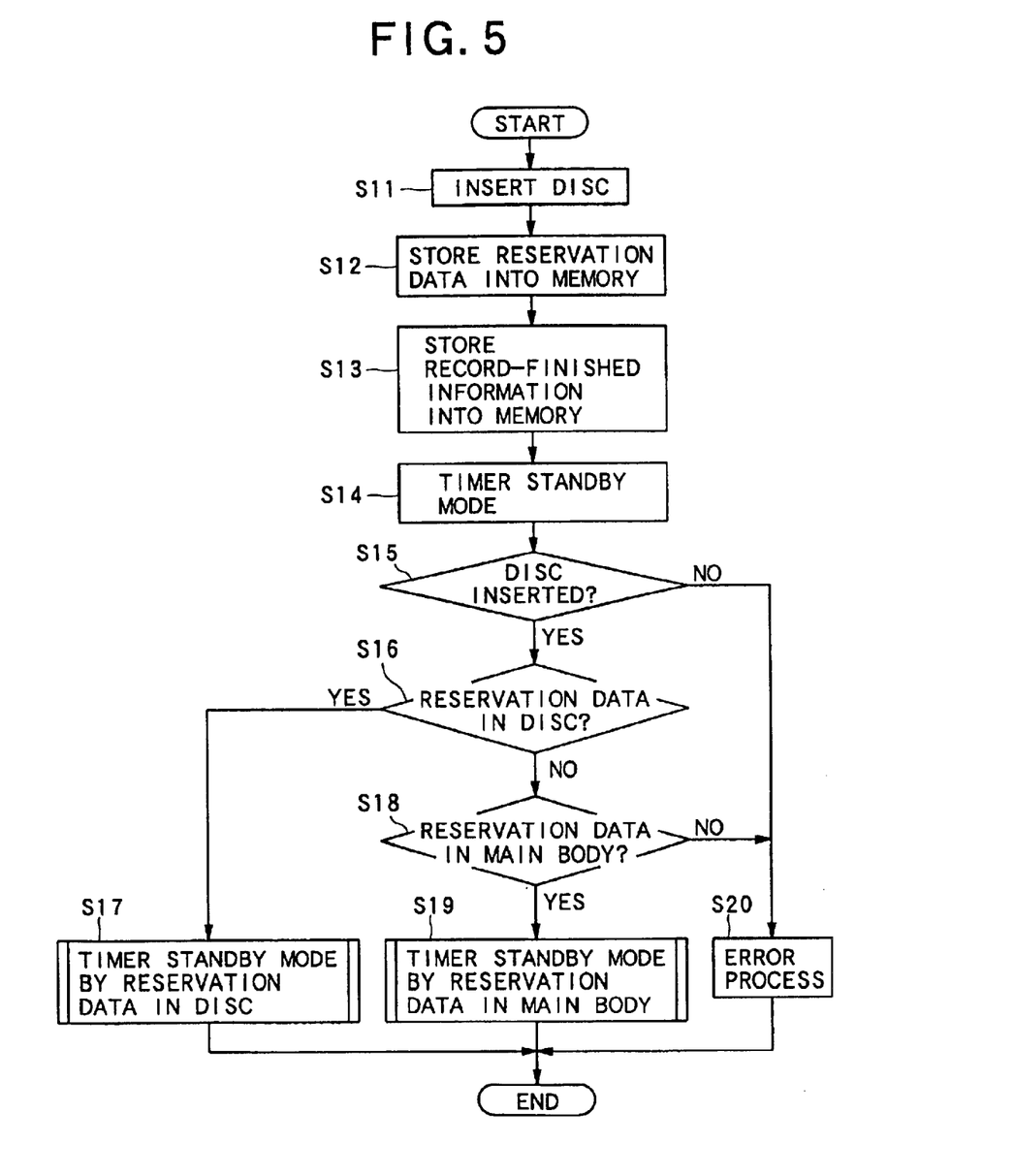
FIG. 5 is a flow chart showing a reserved recording operation in the embodiment.

As shown in FIG. 5, when actually performing the telerecording operation on the basis of the reservation information Y which is recorded by the operation shown in FIG. 4, at first, the optical disc DK is inserted into the information recording and reproducing apparatus S (step S11). Then, the reservation information Y is read out from the optical disc DK, and is stored into the memory 5a (step S12). At this time, if there is no reservation information Y on the optical disc DK, the information indicative of no reservation information is stored into the memory 5a.

Then, the record-finished information L on the optical disc DK is read out and is stored into the memory 5a in the same manner (step S13).

Then, when the user instructs at the operation unit P to perform telerecording on the basis of the time measurement of the timer 7, the operation mode of the information recording and reproducing apparatus S as a whole is switched to a timer standby mode to perform telerecording on the basis of a time measurement signal St from the timer 7 (step S14).

Then, it is judged whether or not the optical disc DK is still inserted in the information recording and reproducing apparatus S (step S15). If it is not inserted (step S15: NO), an error process indicating that the telerecording operation is not possible is performed (step S20). Then, the process is ended.

On the other hand, by the judgment at the step S15, if the optical disc DK is inserted (step S15: YES), it is judged whether or not the reservation information Y on the optical disc DK is stored in the memory 5a (step S16). If it is stored (step S16: YES), the operation mode of the information recording and reproducing apparatus S is set to the timer standby mode using the reservation information Y in the optical disc DK (which is stored in the memory 5a) and the telerecording operation will be performed (step S17).

On the other hand, by the judgment at the step S16, if the reservation information on the optical disc DK is not stored in the memory 5a (step S16: NO), it is judged whether or not another reservation information is stored in the reservation memory unit 6 in the main body of the information recording and reproducing apparatus S (step S18). If the reservation information is stored in the reservation memory unit 6 (step S18: YES), the operation mode of the information recording and reproducing apparatus S is set to the timer standby mode using the reservation information in the reservation memory unit 6, and the reservation telerecording of the television broadcast will be performed by using the reservation information Y in the reservation memory unit 6 (step S19).

Figure 6:
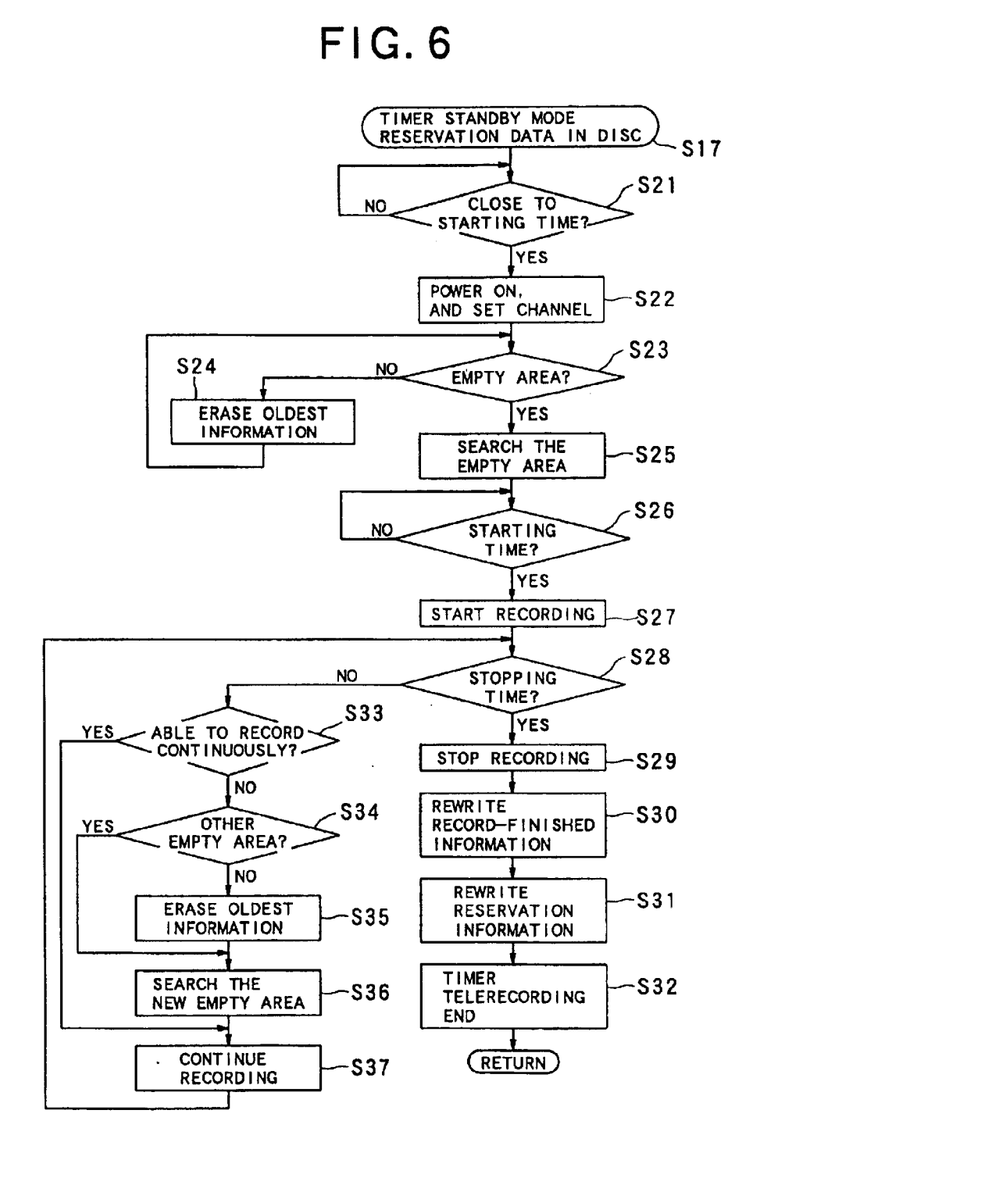
FIG. 6 is a flow chart showing the reserved recording operation in more detail in the embodiment.

Incidentally, as for the concrete content of the operation at the step S19, the operation same as the conventional reservation telerecording operation may be performed, or the operation as shown in FIG. 6 described later may be performed by using the reservation information in the reservation memory unit 6.

Further, by the judgment at the step S18, if the reservation information is not stored in the reservation memory unit 6 (step S18: NO), the above mentioned error process is performed (step S20), and the process is ended.

The timer standby mode set at the process shown in FIG. 5 is explained with reference to a following table.

TABLE

| reservation by timer in the apparatus main body | reservation by timer in the record medium | timer reservation mode |
| --- | --- | --- |
| exist | exists | in-medium reservation mode |
| not-exist | exist | in-medium reservation mode |
| exist | not-exist | in-apparatus reservation mode |
| not-exist | not-exist | non-reservation mode |

Namely, when the reservation information Y exists in the optical disc DK and when another reservation information Y exists in the reservation memory unit 6, the timer standby mode using the reservation information Y in the optical disc DK is predominantly set (step S17).

When the reservation information Y exists in the optical disc DK and when another reservation information Y does not exist in the reservation memory unit 6, the timer standby mode using the reservation information Y in the optical disc DK is set (step S17).

When the reservation information Y does not exist in the optical disc DK and when another reservation information Y exists in the reservation memory unit 6, the timer standby mode using the reservation information Y in the reservation memory unit 6 is set (step S19).

When the reservation information Y does not exist in the optical disc DK and when another reservation information Y does not exist in the reservation memory unit 6 either, the reservation telerecording operation is not performed. In stead, the normal real time telerecording operation is performed.

Next, the content of the reservation telerecording operation using the reservation information Y in the optical disc DK at the step S17 is explained in detail with reference to a flow chart of FIG. 6.

As shown in FIG. 6, when the timer standby mode using the reservation information Y in the optical disc DK is set, at first, it is judged whether or not it is close to the scheduled time to start recording on the basis of the scheduled time to start recording information 13 stored in the reservation information Y. More particularly for example, it is continuously monitored whether or not it is 5 minutes before the scheduled time to start recording on the basis of the time measurement signal St from the timer 7 (step S21).

Then, if it is not close to the scheduled time to start recording (step S21: NO), it stands by as it is. If it is close to the schedule time to start recording (step S21: YES), the power of the information recording and reproducing apparatus S is turned on, and the channel of the television tuner 1 is set to the channel described in the channel information 11 in the reservation information Y (step S22).

Then, on the basis of the record-finished information L which is recorded in the reserved information area YR, it is judged whether or not there is any empty area capable of additionally recording within the optical disc DK (step S23).

If there is no empty area (step S22: NO), the television broadcast, which was recorded at the oldest time on the record-finished information L (which is read out from the reservation information area YR in advance and is stored in the memory 5a), is erased, and this area where the erased television broadcast had been recorded is newly set as the empty area (step S24). Then, the operation flow returns to the step S23. Here, as for the operation of erasing the telerecorded television broadcast at the step S24, the oldest television broadcast in the optical disc DK may be erased on the basis of the record-finished information L, or the oldest television broadcast among the television broadcasts of the same program as the television broadcast which is presently to be telerecorded may be erased.

On the other hand, by the judgment at the step S23, if there is the empty area (step S23: YES), the optical pickup 8 is moved to the head of this detected empty area to standby thereat (step S25).

Then, it is continuously monitored whether or not it is the scheduled time to start recording on the basis of the time measurement signal St from the timer 7 (step S26). If it is not the scheduled time to start recording yet (step S26: NO), it stands by as it is. If it is the scheduled time to start recording (step S26: YES), the telerecording operation is started by the telerecording mode corresponding to the telerecording mode information 15 in the reservation information Y (step S27).

Then, in accordance with the scheduled time to stop recording information 14 in the reservation information Y, it is continuously monitored whether or not it is the corresponding scheduled time to stop recording, on the basis of the time measurement signal St from the timer 7 (step S28). If it is the scheduled time to stop recording (step S28: YES), the telerecording operation is stopped (step S29). Then, the information related to the television broadcast whose telerecording has been just stopped is added to the record-finished information L in the memory 5a (step S30). Further, the reservation information Y related to the television broadcast whose telerecording has been just stopped is erased from the reservation information Y in the memory 5a (the reservation information Y in the optical disc DK) (step S31).

After that, the reservation information Y and the record-finished information L on the optical disc DK are newly updated by using the reservation information Y and the record-finished information L currently stored in the memory 5a, and the timer telerecording operation is ended (step S32).

On the other hand, by the judgment at the step S28, if it is not the scheduled time to stop recording yet (step S28: NO), it is judged whether or not the operation of telerecording the television broadcast continuously to the empty area to which the television broadcast is currently being recorded is possible (step S33). If it is possible (step S33: YES), the telerecording operation is continued as it is (step S37), and the operation flow returns to the step S28.

On the other hand, by the judgment at the step S33, if the empty area is not enough (step S33: NO), it is judged whether or not there is any other empty area (step S34). If there is any other empty area (step S34: YES), the optical pickup 8 is moved to the head of this next empty area (step S36), and the recording operation is continued (step S37).

On the other hand, by the judgment at the step S34, if there is no other empty area (step S34: NO), the television broadcast which was recorded at the oldest time on the record-finished information L on the memory 5a is erased by the method same as the aforementioned step S24, and the area where the erased television broadcast had been recorded is newly set as the empty area (step S35). Then, the steps S36 and S37 are performed.

As described above, according to the operation of the information recording and reproducing apparatus S, the reservation information Y, which includes the scheduled time to start recording and the scheduled time to stop recording as for the television broadcast of a particular kind for each optical disk DK, is recorded on the optical disc DK capable of telerecording the television broadcast. Then, the reservation information Y is read out before telerecording the television broadcast of this particular kind, and the channel is selected and telerecorded in accordance with the read out reservation information Y. Hence, it is possible to telerecord only the television program of the particular kind, which is peculiar to the pertinent optical disc DK, on the pertinent optical disc DK.

By the operation of the operation unit P, it is possible to produce the optical disc DK, on which the reservation information Y to telerecord the television broadcast of this particular kind is recorded.

When there is the reservation information Y in the optical disc DK, the television broadcast of the particular kind is telerecorded on the basis of the reservation information Y in the optical disc DK. When the reservation information Y does not exist in the optical disk DK, the television broadcast of the particular kind is telerecorded onto the optical disc DK on the basis of another reservation information Y stored in the reservation memory unit 6. Hence, even if the reservation information Y does not exist in the optical disc DK, it is possible to telerecord the corresponding television broadcast of the particular kind.

On the basis of the record-finished information L, when there is any recordable area, the television broadcast of the particular kind is telerecorded to this recordable area. When there is no recordable area, the new television broadcast of the particular kind is telerecorded to the record position of the oldest television broadcast. Hence, it is possible to avoid the case in which the new television broadcast of the particular kind cannot be telerecorded.

Since the optical disc DK is employed as the record medium and the reservation information is collectively recorded to the most inner-circumferential portion of the record area R on the optical disc DK, it is possible to speedily search the record position and the reservation information.

Further, according to the information recording and reproducing apparatus S, it is possible to record and reproduce the specific information on the basis of the reservation information Y by use of just one apparatus, Although in the above described embodiment, the optical disc DK is employed as one example of the record medium, it is possible to adapt the present invention to the information recording apparatus, which records the information on a tape-shaped record medium such as a VTR.

In addition to the construction of the above described embodiment, such a construction may be employed that, when the optical disc DK on which the reservation information Y is recorded is inserted, the telerecording operation by another method (e.g., telerecording operation without using the timer 7) is prohibited.

Furthermore, by referring to the record-finished information L in the optical disc DK, when the television broadcast of the same kind as that of the television broadcast which has been already recorded (e.g., weekly drama) is to be recorded, it is possible to erase the already-recorded television broadcast of the same kind (e.g., the portion of the pertinent weekly drama which was broadcasted one week before) and to record the new television broadcast at the record position of this erased television broadcast.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-061359 filed on Mar. 12, 1998 including the specification, claims, and summary is incorporated herein by reference in its entirety.

What is claimed is:

1. An information recording apparatus for recording record information of particular one kind onto a record medium, on which the record information and reservation information to perform a reserved recording operation for the record information are recordable, the reservation information comprising: a scheduled time to start recording onto the record medium the record information of said particular one kind, which is set in advance for respective one of record mediums including the record medium, among the record information of a plurality of different kinds which are recordable on the record mediums; and a scheduled time to stop recording onto the record medium the record information of said particular one kind, the apparatus comprising:

a read out device for reading out the reservation information from the record medium;

an extraction device for extracting the record information of said particular one kind from among the record information of the different kinds which are inputted from the external;

a record device for starting recording onto the record medium the extracted record information of said particular one kind when it is the scheduled time to start recording and for stopping recording onto the record medium the extracted record information of said particular one kind when it is the schedule time to stop recording, on the basis of the read out reservation information; and a memory device for storing the reservation information separately from the record medium, wherein the record device records the record information of said particular one kind in accordance with the reservation information recorded on the record medium in preference to the reservation information stored in the memory device if the reservation information is recorded on the record medium, and the record device records the record information of said particular one kind in accordance with the reservation information stored in the memory device if the reservation information is not recorded on the record medium.

2. An apparatus according to claim 1, the apparatus further comprising a generation device for generating the reservation information on the basis of the scheduled time to start recording and the scheduled time to stop recording which are set in advance of the reserved recording operation, wherein the record device records onto the record medium the generated reservation information before recording the record information of said particular one kind.

3. An apparatus according to claim 1, wherein the record medium comprises a disc-shaped type record medium, and the reservation information is recorded at a most inner-circumferential portion of a recordable area of the disc-shaped type record medium.

4. An information recording apparatus for recording record information of particular one kind onto a record medium, on which the record information and reservation information to perform a reserved recording operation for the record information are recordable, the reservation information comprising: a scheduled time to start recording onto the record medium the record information of said particular one kind, which is set in advance for respective one of record mediums including the record medium, among the record information of a plurality of different kinds which are recordable on the record mediums; and a scheduled time to stop recording onto the record medium the record information of said particular one kind, the apparatus comprising:

a read out device for reading out the reservation information from the record medium;

an extraction device for extracting the record information of said particular one kind from among the record information of the different kinds which are inputted from the external; and a record device for starting recording onto the record medium the extracted record information of said particular one kind when it is the scheduled time to start recording and for stopping recording onto the record medium the extracted record information of said particular one kind when it is the schedule time to stop recording, on the basis of the read out reservation information, wherein the record device further records onto the record medium history information when recording the record information of said particular one kind is finished, the history information comprising a recording date, a time to start recording, a time to stop recording and a recording position on the record medium, and the apparatus further comprises a control device for controlling the record device to record new record information of said particular one kind to a non-recorded area on the record medium if there exists the non-recorded area in accordance with the history information, and to record the new record information of said particular one kind to a recorded area where the oldest record information of said particular one kind has been recorded if there does not exist the non-recorded area in accordance with the history information.

5. An apparatus according to claim 4, further comprising a generation device for generating the reservation information on the basis of the scheduled time to start recording and the scheduled time to stop recording which are set in advance of the reserved recording operation, wherein the record device records onto the record medium the generated reservation information before recording the record information of said particular one kind.

6. An apparatus according to claim 4, wherein the record medium comprises a disc-shaped type record medium, and the reservation information is recorded at a most inner-circumferential portion of a recordable area of the disc-shaped type record medium.

* * * * *